(12) United States Patent
Bruzi et al.

(10) Patent No.: US 12,287,123 B2
(45) Date of Patent: Apr. 29, 2025

(54) REVERSIBLE AIR DEFLECTOR AND VENTILATION SYSTEM

(71) Applicants: Krzysztof Bruzi, Dobrzyca (PL); Renata Bruzi, Dobrzyca (PL)

(72) Inventors: Krzysztof Bruzi, Dobrzyca (PL); Renata Bruzi, Dobrzyca (PL)

( * ) Notice: Subject to any disclaimer, the term of this patent is extended or adjusted under 35 U.S.C. 154(b) by 450 days.

(21) Appl. No.: 17/169,365

(22) Filed: Feb. 5, 2021

(65) Prior Publication Data
US 2021/0164673 A1 Jun. 3, 2021

Related U.S. Application Data

(63) Continuation of application No. PCT/PL2019/000051, filed on Jul. 4, 2019.

(30) Foreign Application Priority Data

Aug. 7, 2018 (PL) .......................... 426578

(51) Int. Cl.
*F24F 7/00* (2021.01)
*F24F 7/003* (2021.01)
(Continued)

(52) U.S. Cl.
CPC .............. *F24F 7/013* (2013.01); *F24F 7/003* (2021.01); *F24F 13/28* (2013.01); *F24F 13/30* (2013.01);
(Continued)

(58) Field of Classification Search
CPC .. F24F 7/013; F24F 7/003; F24F 7/007; F24F 7/06; F24F 13/28; F24F 13/30;
(Continued)

(56) References Cited

U.S. PATENT DOCUMENTS

| 4,497,031 A | * | 1/1985 | Froehling ................ F24F 11/63 165/212 |
| 5,169,121 A | * | 12/1992 | Blanco ................ F24F 13/1426 310/68 B |
| 2019/0170389 A1 | | 6/2019 | Pozniak et al. |

FOREIGN PATENT DOCUMENTS

| CN | 105650798 A | 6/2016 |
| PL | 418279 | 5/2019 |
| WO | 2016153371 A1 | 9/2016 |

OTHER PUBLICATIONS

International Search Report issued by the International Searching Authority for corresponding International Patent Application No. PCT/PL2019/000051, mailed on Sep. 24, 2019.

* cited by examiner

*Primary Examiner* — Allen R. B. Schult
(74) *Attorney, Agent, or Firm* — Myers Wolin, LLC

(57) ABSTRACT

A two-part reversible air deflector for reversing the flow direction of air pumped by a radial fan with constant rotation direction and a ventilation system formed of ventilation installations with use of reversible air deflectors, wherein the air deflector is divided into the suction-inlet body and the separate compression-outlet body, each of them having the frontal through opening surrounded with an annular protrusion wherein both bodies and of the deflector are arranged opposite a fixed partition having a round through opening with its edge of a funnel outline surrounded on two sides with a pair of annular protrusions in such a manner that the common axis X of frontal openings of the bodies is aligned with the axis of the round opening of the partition.

9 Claims, 17 Drawing Sheets

(51) Int. Cl.
*F24F 7/013* (2006.01)
*F24F 13/28* (2006.01)
*F24F 13/30* (2006.01)

(52) U.S. Cl.
CPC ..... *F24F 2007/005* (2013.01); *F24F 2221/17* (2013.01)

(58) Field of Classification Search
CPC ...... F24F 13/02; F24F 13/10; F24F 2007/005; F24F 2221/17
USPC ........................................................ 454/329
See application file for complete search history.

US 12,287,123 B2

REVERSIBLE AIR DEFLECTOR AND VENTILATION SYSTEM

CROSS REFERENCE TO RELATED APPLICATIONS

This application is a continuation under 35 U.S.C. § 120 of International Application PCT/PL2019/000051, filed Jul. 4, 2019, which claims priority to Polish Application No. P.426578, filed Aug. 7, 2018, the contents of each of which are incorporated by reference herein.

FIELD OF THE INVENTION

This disclosure relates to a ventilation device with reversible direction of air flow inside a through compartment with a reversible air driver and a radial fan with constant rotation direction, as well as a system of duct-free, reverse ventilation of buildings, where said ventilation is used.

BACKGROUND

Polish patent application P. 418279 discloses a ventilation device reversing the air flow direction inside a through compartment, inside which a uniform, reversible air driver provided with its own drive is installed on a bearing. The air driver is made of a hollow suction-inlet body and a hollow pumping-outlet body placed around the same rotation axis. Each body of the driver is provided with a side outlet and a through frontal opening, wherein the side outlets of both bodies are oriented in opposite directions, and axes of openings in both bodies are aligned with their mutual rotation axis. A radial fan with constant direction of rotation is located in the pumping-outlet body of the driver. Two ribs are formed on circumferential edges of the bodies, tightly fitted to the internal, circumferential frame of walls of the through compartment at their extreme ends, dividing the compartment in the transverse direction. The rotor of the fan is driven with a motor installed directly on a stationary core, which is also used as a bearing for the driver. The through compartment of this known ventilation device is not intended for placement of additional air treating devices inside, in particular, for placement of fresh air filters, as such elements would be exposed to undesirable effects of used outlet air.

A system of duct-free, reverse ventilation of buildings where people are present is also known, and provided with ventilation and heat recovery devices. Ventilation devices used in this system have the form of reversible radial fan, located in individual premises of the building. Each of the fans is placed inside an opening provided in the external wall of the building, wherein such openings also include fresh air filters and regenerative heat exchangers. This known ventilation system requires use of at least two axial fans operating in opposite phases. A disadvantage of this solution lies in the relatively small power of axial fans, resulting in their low efficiency and poor compression, as well as low efficiency caused by high energy consumptions caused by the fan motor start-up taking place every several seconds.

SUMMARY

According to the disclosure, the ventilation device with reversible direction of air flow in at least one through compartment is provided with a reversible air driver, installed on a bearing inside said compartment and provided with its own drive. The air driver is made of a hollow suction-inlet body and a hollow pumping-outlet body placed around the same rotation axis. Each body of the air driver is provided with a side outlet and a through frontal opening, wherein the side outlets of both bodies are oriented in opposite directions, and axes of openings in both bodies are aligned with their mutual rotation axis. A radial fan with constant direction of rotation is located in the pumping-outlet body of the driver, in at least one of the through compartments. Two ribs are formed on circumferential edges of the bodies of the driver, tightly fitted to the internal, circumferential frame of walls of the through compartment at their extreme ends, dividing the compartment in the transverse direction. The fan is attached to a drive element, located on a stationary support. The ventilation device according to the disclosure is characterised in that each through compartment is divided into three parts in a serial layout, wherein the reversible air driver is located in the middle part of the through compartment, and a longitudinal partitioning element passes through the initial part and the middle part of the compartment, separating said parts into two parallel branches provided as a suction duct and as a pumping duct, wherein air treatment elements are located inside the suction duct and the pumping duct of the initial part and of the end part of the compartment. A preferable embodiment of the solution is provided with a through compartment with a uniform reversible driver, the suction-inlet body of which is rigidly connected to the pumping-outlet body. The longitudinal partitioning element of the compartment is provided on the driver side with a concave edge bent into an arc, meshed with a rotary flange located between two bodies of the driver, comprising an internal element of each of the bodies and in which a through opening with a funnel outline is made, matching the internal diameter of the radial fan rotor, wherein the rotary flange separates the second part of the through compartment into suction areas and pumping areas. In order to prevent uncontrolled air flow between the suction and the pumping areas of the through compartment, a contactless labyrinth seal is formed at the junction of the compartment edge and the rotary flange. In another embodiment of the solution, the through compartment is provided with a two-part air driver, divided into a suction-inlet body and a separate pumping-outlet body, with each of the bodies provided with a frontal, through opening surrounded by a ring-shaped protrusion, and the partitioning element of the through compartment is provided in its middle part with a round, through opening surrounded on both sides with a pair of ring-shaped protrusions, wherein both bodies of the driver are located on both sides of the round opening of the partitioning element, and their ring-shaped protrusions are meshed with a pair of ring-shaped protrusions of the partitioning element. Contactless labyrinth seals are formed at the junction of protrusions surrounding the opening of the partitioning element and of the protrusions surrounding the frontal openings of both bodies of the two-part driver. In an embodiment of the compartment with a two-part air driver, each of its bodies is provided with a separate drive motor or both bodies of the driver are powered by a common motor, using a gear. Depending on the needs, the device according to the solution is provided with a single, through compartment or comprises a set of two through compartments, located one after the other, wherein middle parts of these compartments are connected using an intermediate duct, which contains an air treatment device provided as a regenerating heat exchanger. Initial parts of both compartments with longitudinal partitioning elements formed therein are located on the opposite ends of the compartment system, wherein two air treatment devices are located in suction ducts separated by these partitioning elements. In the case of some ventilation devices according to the solution, which do not require high compression rates, the reversible air driver located in one of the two through compartments may not include a fan. The air treatment device located in the suction duct of the through compartment is provided as an air filter. The air treatment device located in the pumping duct and in the intermediate duct of through compartments is provided as a regenerating heat exchanger, however, the device installed in the pumping duct of the compartment may also be provided as a muffler. The driving element of the fan is a motor located inside the fan rotor and connected to the rotor, the body of which is placed on a removable disc with a matching profile, wherein the removable disc is installed on the free end of a bracket attached at its opposite end to the wall of the through compartment. In another embodiment, the driving element of the fan is a motor located outside the through compartment, attached to the wall of the compartment and connected to the fan rotor using a drive shaft, passing through a sealed wall of the compartment.

On the other hand, the system of duct-free, reverse ventilation of buildings where people are present according to the solution is provided with ventilation and heat recovery devices. The system according to the solution is characterised in that it has at least two inlet-outlet ventilation systems, active in opposite inlet or outlet phases. At least one of these installations is provided as a ventilation device, formed in at least one through compartment with two inlet-outlet terminal openings and a reversible air driver placed on a bearing inside the compartment. The air driver is made of a hollow suction—inlet body and a hollow pumping-outlet body, with the same rotation axis. Each body of the driver is provided with a side outlet and a through frontal opening, wherein the side outlets of both bodies are oriented in opposite directions, and axes of frontal openings in both bodies are aligned with their mutual rotation axis. A radial fan with constant direction of rotation is placed in the pumping-outlet body of the driver placed in at least one of the through compartments. Each through compartment of the ventilation device is divided into three parts in a serial layout, and the reversible air driver is located in the middle part of the through compartment. A longitudinal partitioning element is passing through the initial part and through the middle part of the compartment, separating these parts into two parallel branches formed as a suction duct and as a pumping duct. Air treatment devices are located inside the suction duct and the pumping ducts of the initial and of the middle part of the through compartment. One of terminal openings of the through compartment is connected to an opening formed in the external wall of the building, and the other terminal opening of the compartment is located inside the main premise of the building. This building is provided with a toilet room with tight doors, while internal doors of its other premises are provided with openings ensuring air flow. Depending on the needs of the users of the building, the ventilation device according is provided with a single, through compartment or comprises a set of two through compartments, located one after the other, connected using an intermediate duct, which contains an air treatment device provided as a regenerating heat exchanger. In the case of ventilation devices according to the disclosure, which do not require high compression rates, the reversible air driver located in one of the two through compartments does not include a fan. Depending on the needs, a uniform air driver or a two-part air driver is located inside the middle part of the through compartment. In a preferable embodiment of the disclosure, the inlet-outlet ventilation systems are formed by two ventilation devices with identical efficiency, installed on the opposite sides, at external walls of the building. In the case of another preferable embodiment of the disclosure, one of the inlet-outlet ventilation installations is provided as a central ventilation device, wherein one of the terminal openings of the through compartment of this device is provided in the external wall of the building, while the second terminal opening of the compartment is located inside the main, ventilated premise of the building, while the second inlet-outlet ventilation installation is made out of many local ventilation devices installed in the remaining, ventilated premises of the building, wherein one of the openings of the through compartment of each of the local ventilation devices is located in the external wall of the ventilated premise, whilst the other opening of the through compartment is located inside this premise. In the case of yet another preferable embodiment of the solution, one of the inlet-outlet ventilation installations is a ventilation device, while the other inlet-outlet installation device is provided as at least one passive ventilating fan, connected to an opening provided in the external wall of the building, equipped with tight windows and tight external doors. The ventilating fan in its simplified form is made of a stationary, regenerating heat exchanger and two air filters located at its sides, placed inside the opening of the external wall of the building. On the other hand, in the complex version, the ventilated fan is provided with a fresh air filter, at least one reversible air driver, a stationary regenerating heat exchanger and a used air filter, forming a serial arrangement in the through compartment with two terminal, inlet-outlet openings, wherein one of the compartment openings is located in the external wall of the building, while the other opening is located inside the ventilated premise. In a preferable embodiment of the solution, the ventilating fan is provided with a uniform air driver, the suction-inlet body of which is rigidly connected to the pumping-outlet body, whilst the partitioning element of the through compartment is provided with a concave edge formed into an arc on the driver side, meshed with a rotary flange located between the two bodies of the driver, comprising an integral element of each of the bodies and in which a through opening is formed, wherein the flange separates the middle part of the through compartment into suction areas and pumping areas, while a fresh air filter is located inside the suction duct of the initial part of the compartment, and a heat exchanger and a used air filter are placed inside the pumping duct of the end part of the through compartment. In another preferable embodiment of the solution, the ventilating fan is provided with a two-part air driver, divided into a suction-inlet body and a separate pumping-outlet body, with each of the bodies provided with a frontal, through opening surrounded by a ring-shaped protrusion, and the partitioning element of the through compartment is provided in its middle part with a round, through opening surrounded on both sides with a pair of ring-shaped protrusions, wherein both bodies of the driver are located on both sides of the round opening of the partitioning element, wherein their ring-shaped protrusions are meshed with the pair of ring-shaped protrusions of the partitioning element, and a fresh air filter is located in the suction duct of the initial part of the through compartment, and a heat exchanger and a used air filter are located inside the pumping duct of the end part of the through compartment. In yet another embodiment of the solution, the ventilation system is provided with a set of many ventilating fans, and at least one ventilating fan is installed in each of the ventilated premises of the building. The regenerating heat exchanger is provided as a stationary accumulating bed, through which the ventilating air flows, or as a flow-type heater/cooler, filled with a thermodynamic medium subjected to cyclic condensation/evaporation as a result of pressure changes. The toilet of the building is provided with a ventilation opening with a flap swivelling to one side in its internal wall, wherein the flap automatically opens towards the interior of the toilet room as a result of air flow, whilst it closes under the influence of gravity. The toilet room is also provided with a periodically operating outlet fan, with a blind cutting off the air flow when switched off. The toilet an is provided with a signalling device indicating that the fan has been switched on and with a wired or wireless connection with the radial fan of the ventilation device, ensuring a periodic decrease of its rotation speed.

Thanks to the solution according to the solution, devices ensuring treatment of the inlet fresh air may be placed inside the through compartment of the ventilation device, filters in particular, without exposing them to unfavourable influence of used, outlet air during the outlet phase. The used air filter is also bypassed during the inlet phase by the stream of fresh air. Installation of the fan motor on a removable support disc or outside the through compartment enables engines with various outlines and sizes to be selected. Additionally, thanks to the use of radial fans with constant rotation direction, equipped with drive motors with relatively high power, high efficiency and effectiveness of ventilation devices themselves, as well as of duct-free, reversible ventilation systems of buildings using these devices are achieved.

The subject of the disclosure is explained in more detail using an embodiment presented in the drawing, in which the figures present as follows:

DETAILED DESCRIPTION OF THE PREFERRED EMBODIMENTS

Figure 1:
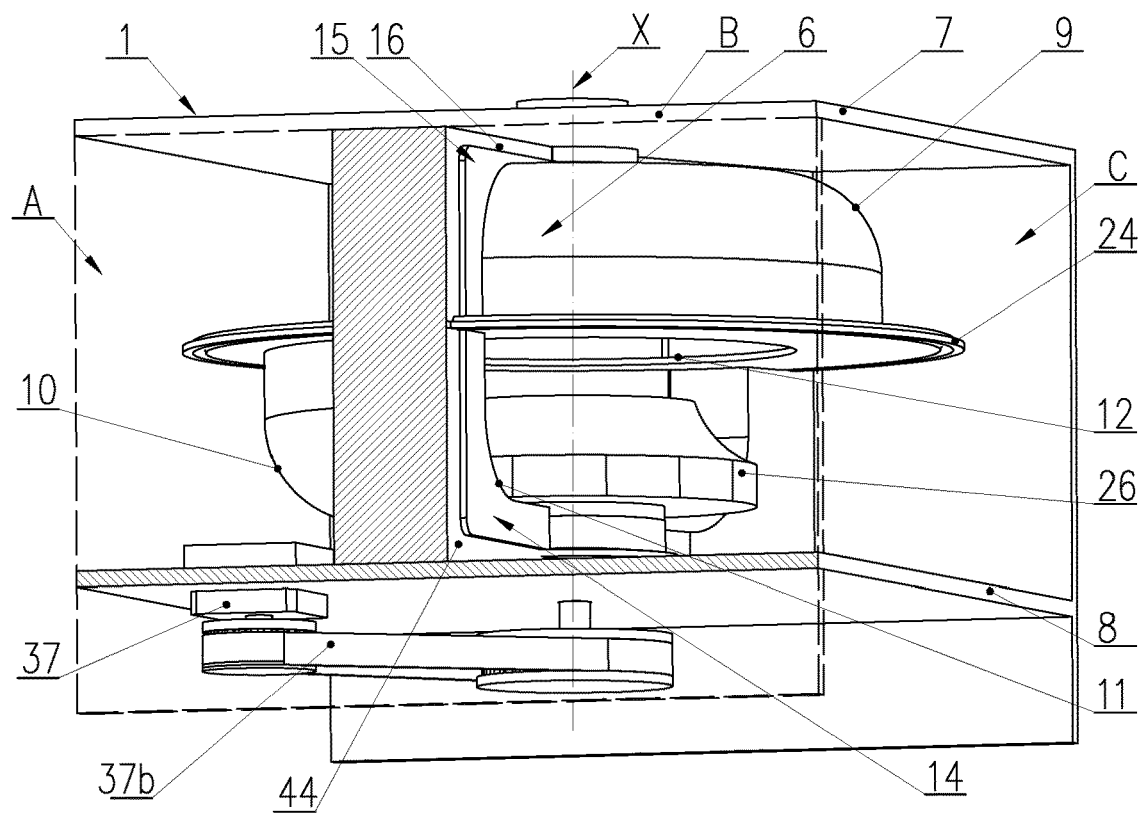
FIG. 1—shows a perspective view of the ventilation device with the through compartment, equipped with a longitudinal partitioning element, a radial fan and a uniform, reversible air driver.
Figure 2:
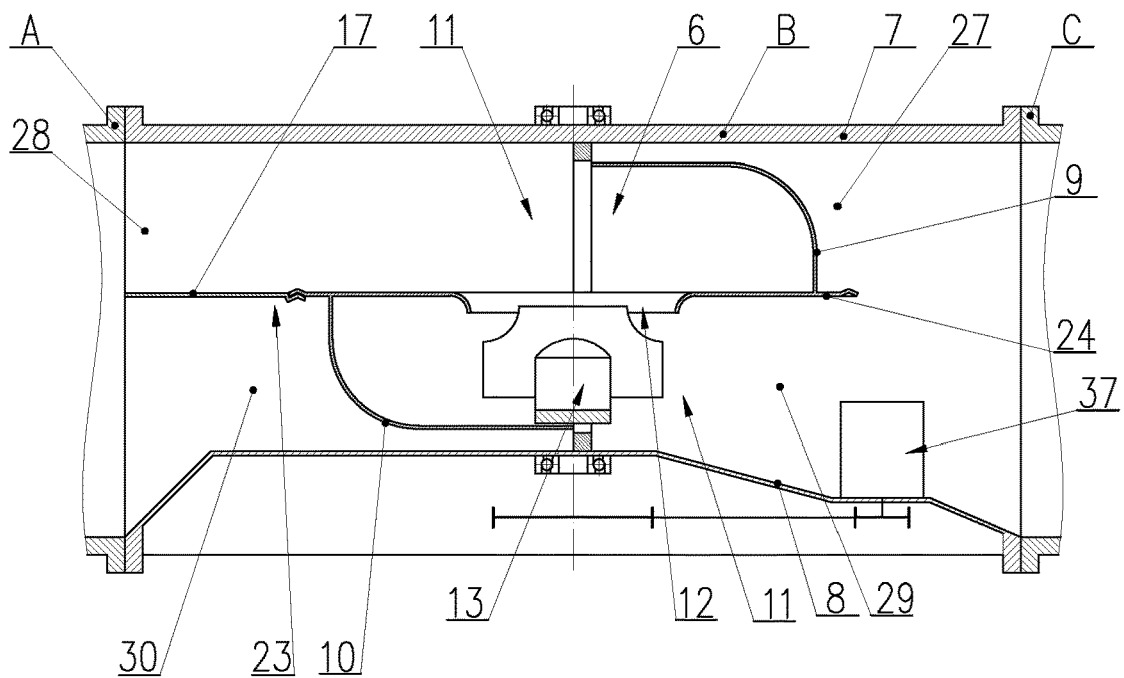
FIG. 2—shows a longitudinal cross-section of the middle part of the ventilation device.
Figure 3:
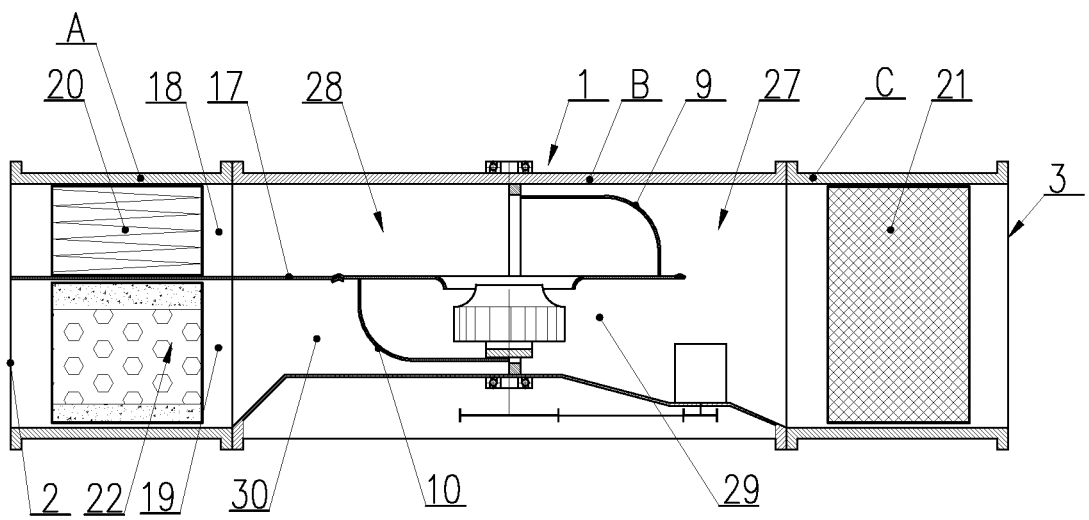
FIG. 3—shows a longitudinal cross-section of the device during the air inlet phase.
Figure 4:
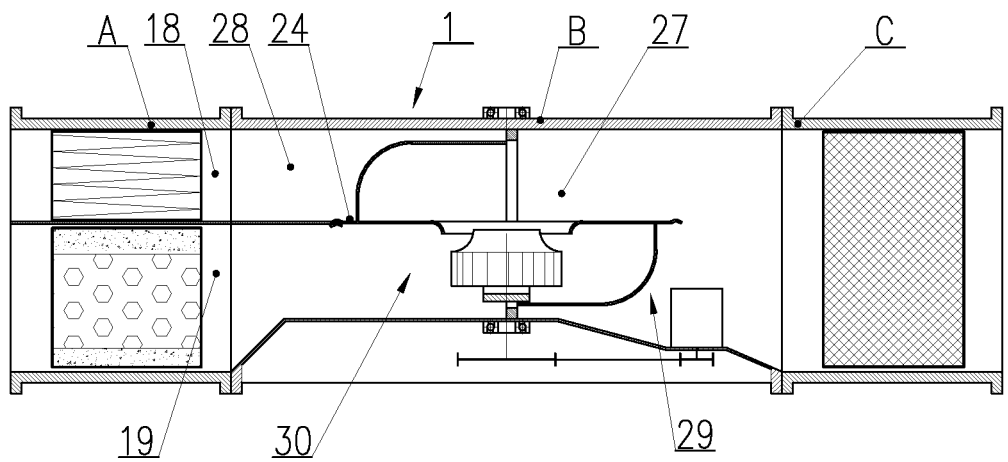
FIG. 4—shows a longitudinal cross-section of the device during the air outlet phase.
Figure 5:
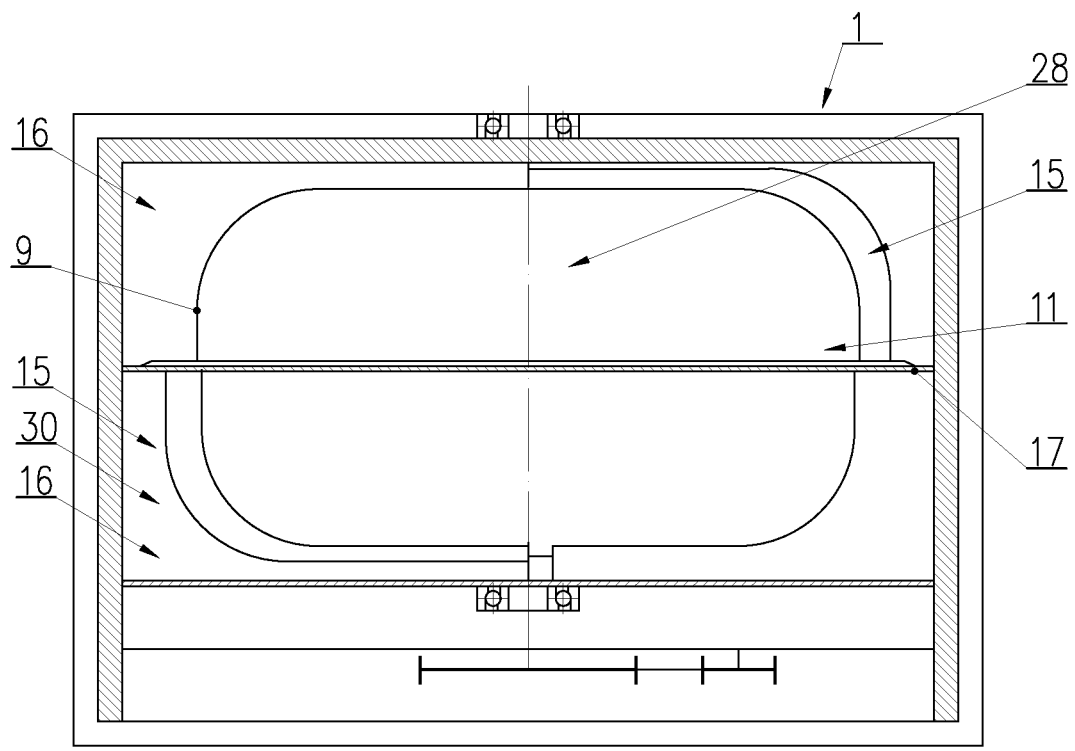
FIG. 5—shows a cross-section during the middle part of the device during the air inlet phase.
Figure 6:
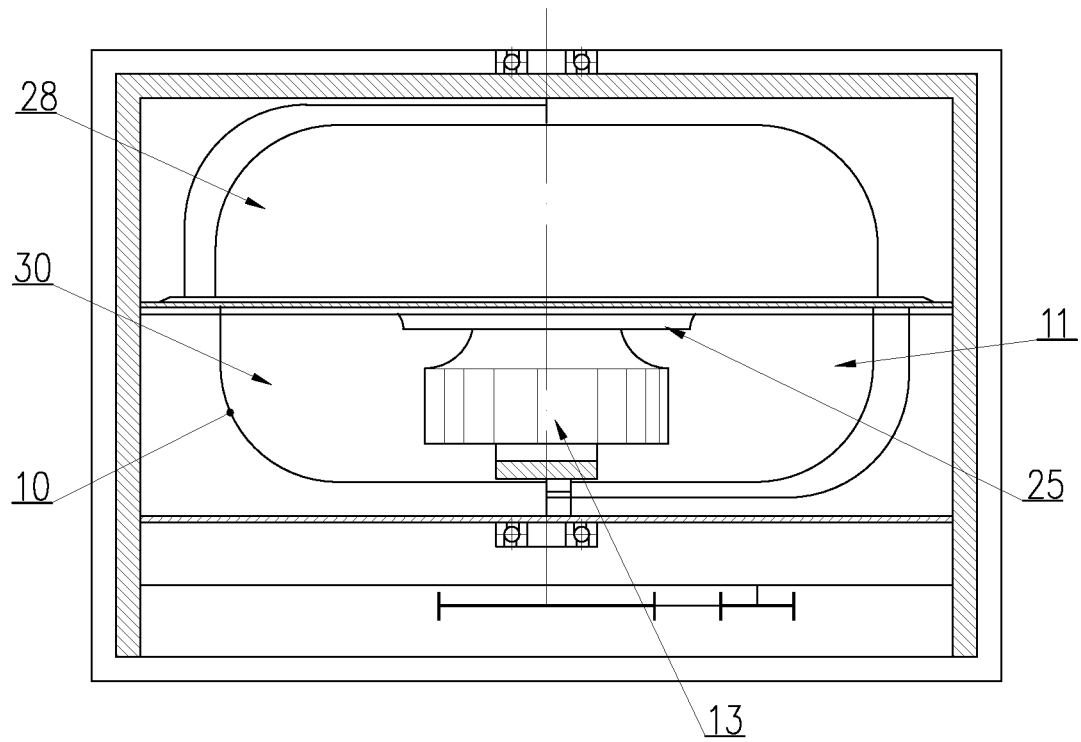
FIG. 6—shows a cross-section during the middle part of the device during the air outlet phase.
Figure 7:
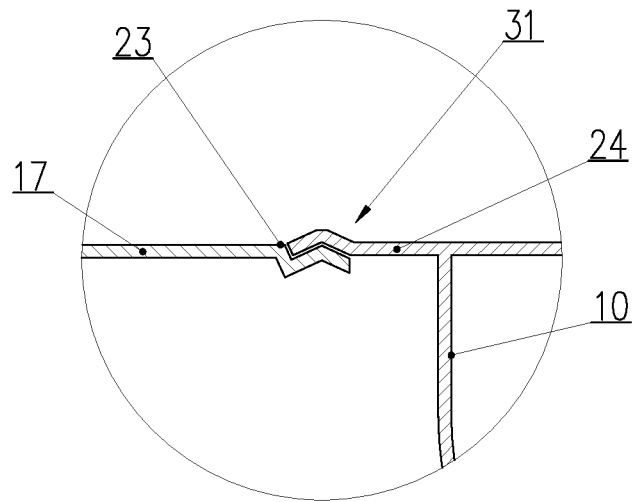
FIG. 7—shows an expanded cross-section through the labyrinth seal of the partitioning element and of the air driver flange.
Figure 8:
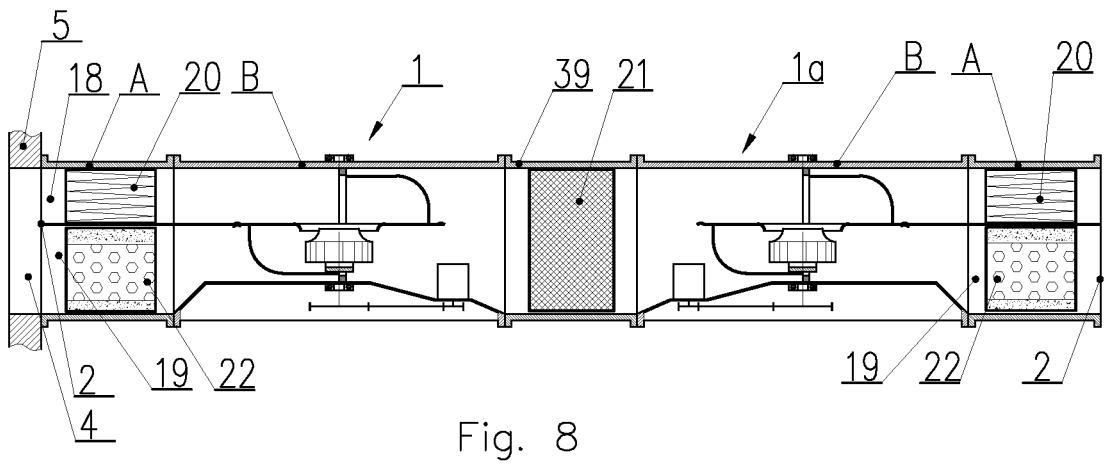
FIG. 8—shows a longitudinal cross-section through a two-compartment ventilation device during the inlet phase.
Figure 9:
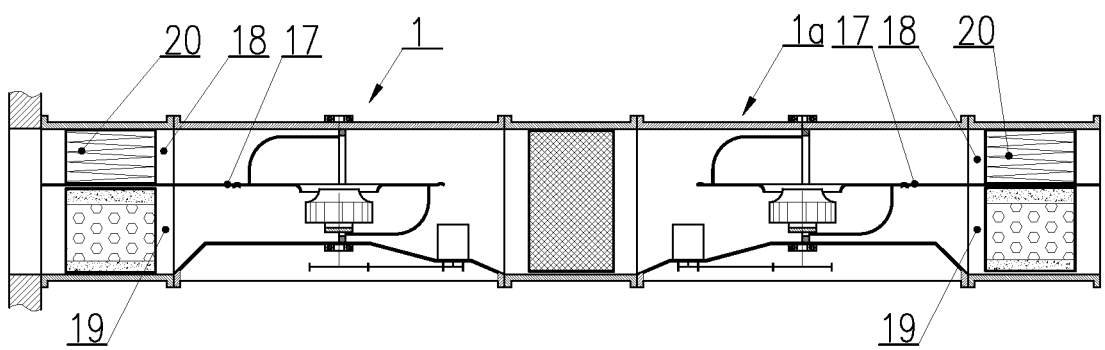
FIG. 9—shows a longitudinal cross-section through a two-compartment ventilation device during the outlet phase.
Figure 10:
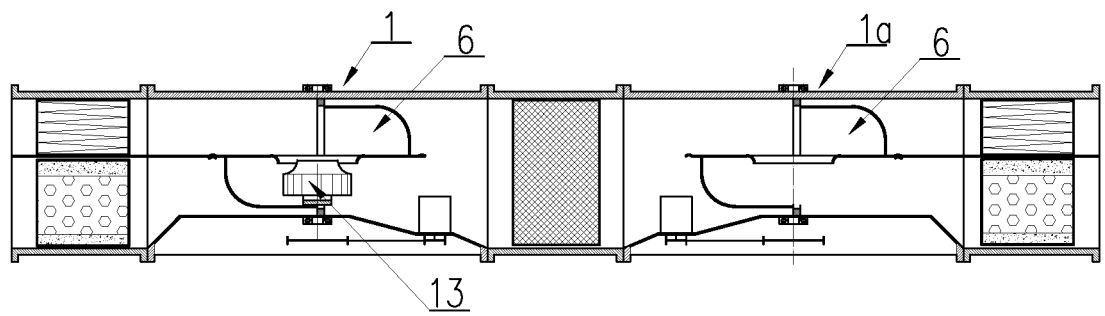
FIG. 10—shows a longitudinal cross-section through a two-compartment device, wherein one of the compartment does not have a fan.
Figure 11:
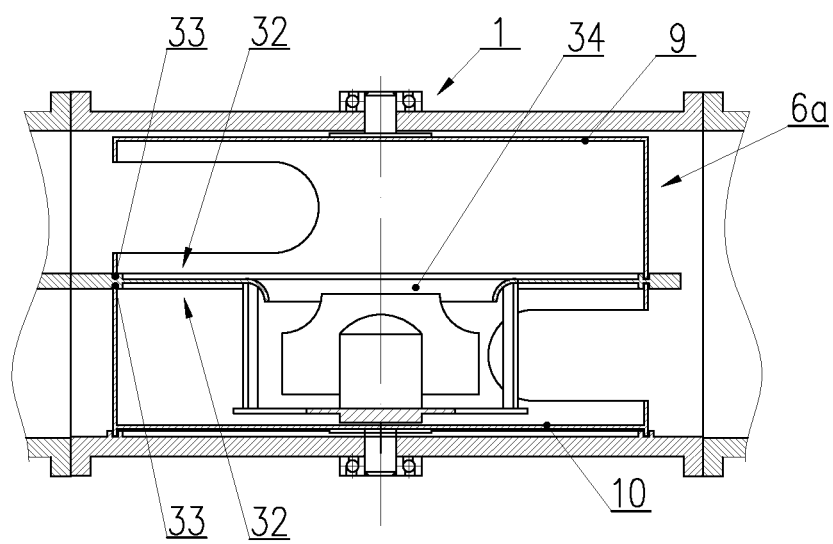
FIG. 11—shows a longitudinal cross-section through the middle part of the device with a two part driver in the air outlet phase.
Figure 12:
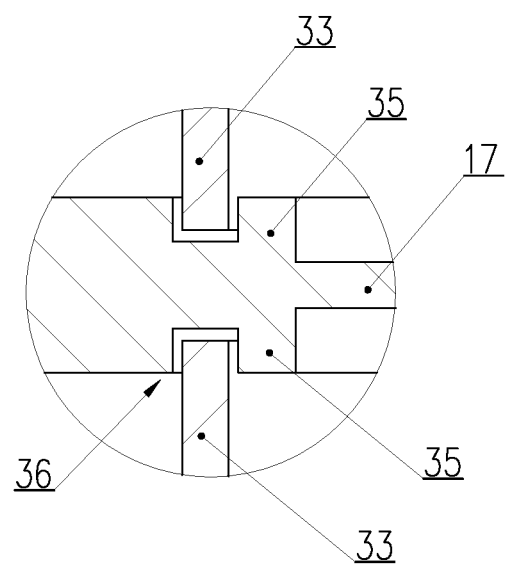
FIG. 12—shows an expanded cross-section through the labyrinth seal of bodies of the two part air driver.
Figure 13:
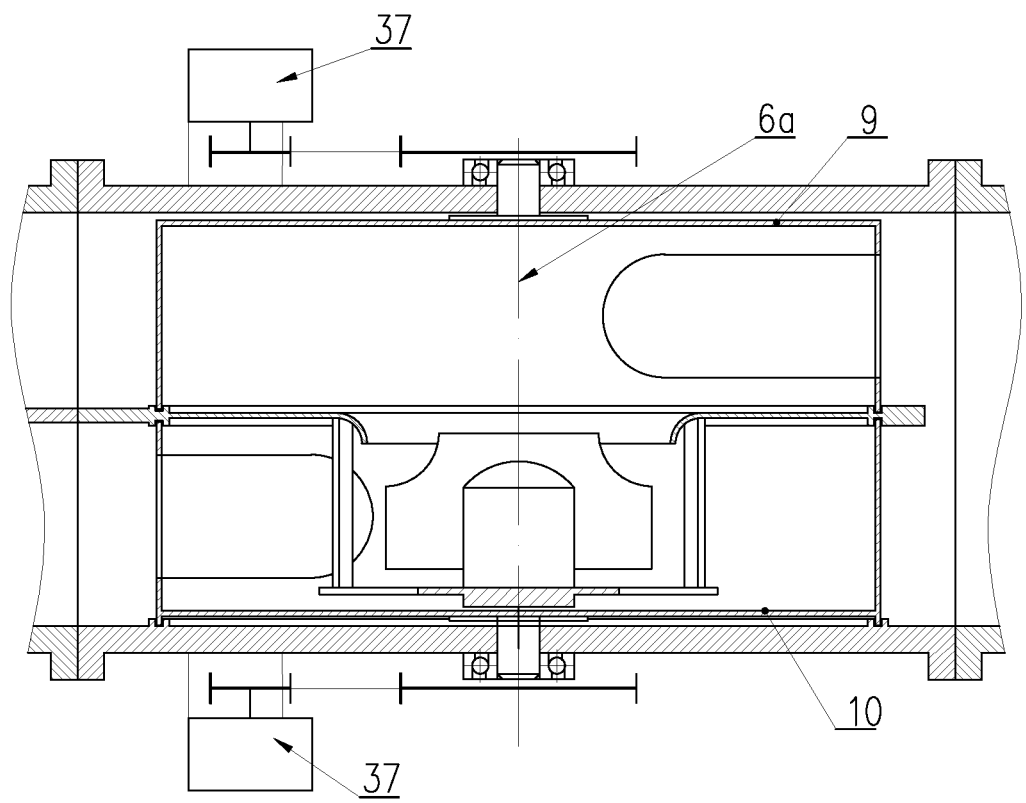
FIG. 13—shows a longitudinal cross-section through the middle part of the device with separate body drives of the two part air driver.
Figure 14:
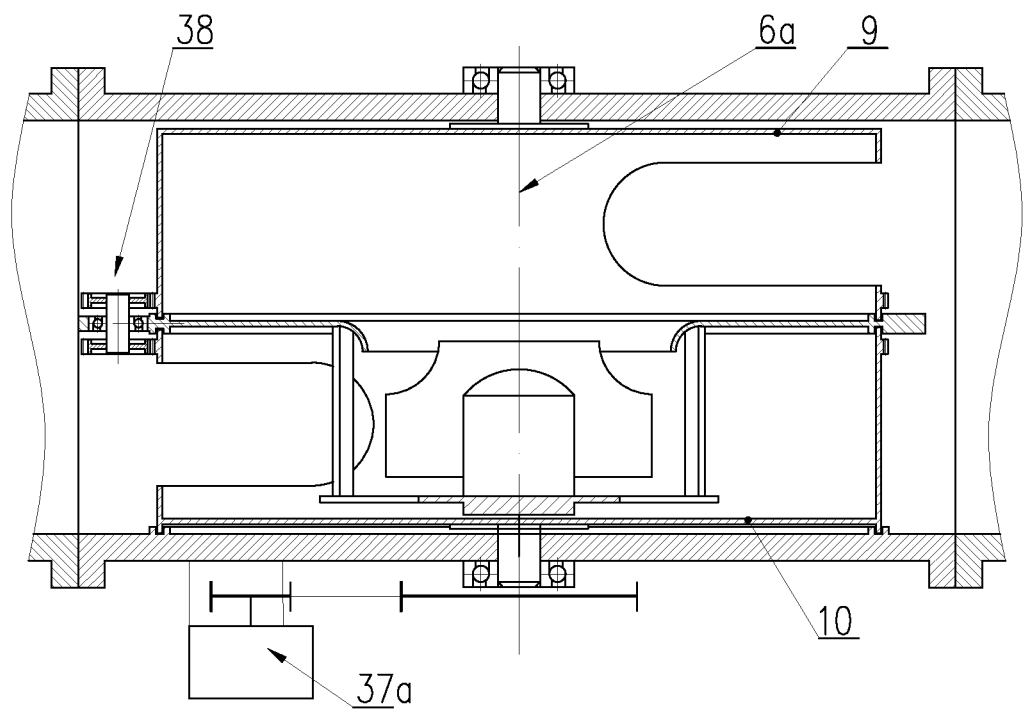
FIG. 14—shows a longitudinal cross-section through the middle part of the device with a common drive of bodies of the two part air driver.
Figure 15:
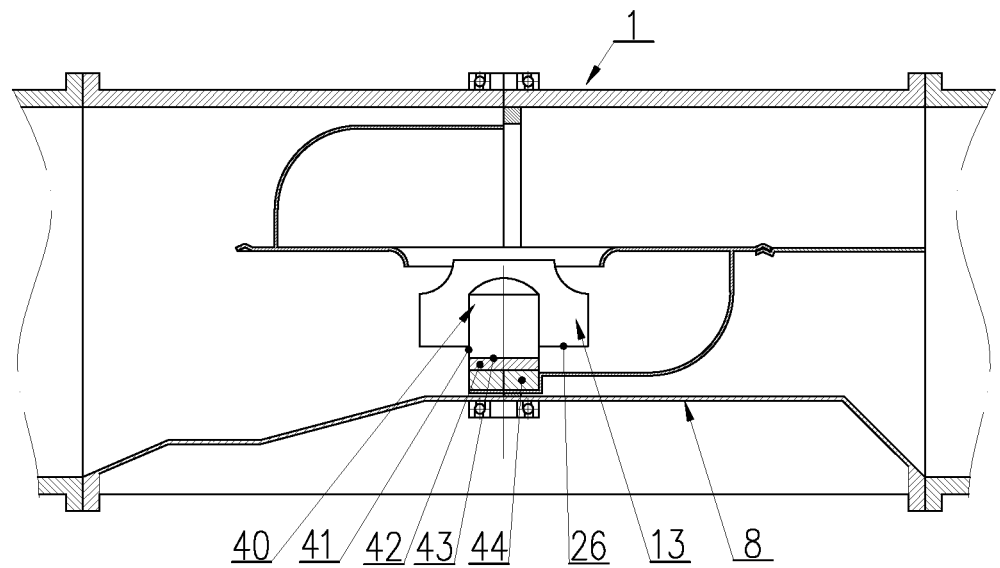
FIG. 15—shows a longitudinal cross-section through the middle part of the device with a two part air driver and an internal fan drive.
Figure 16:
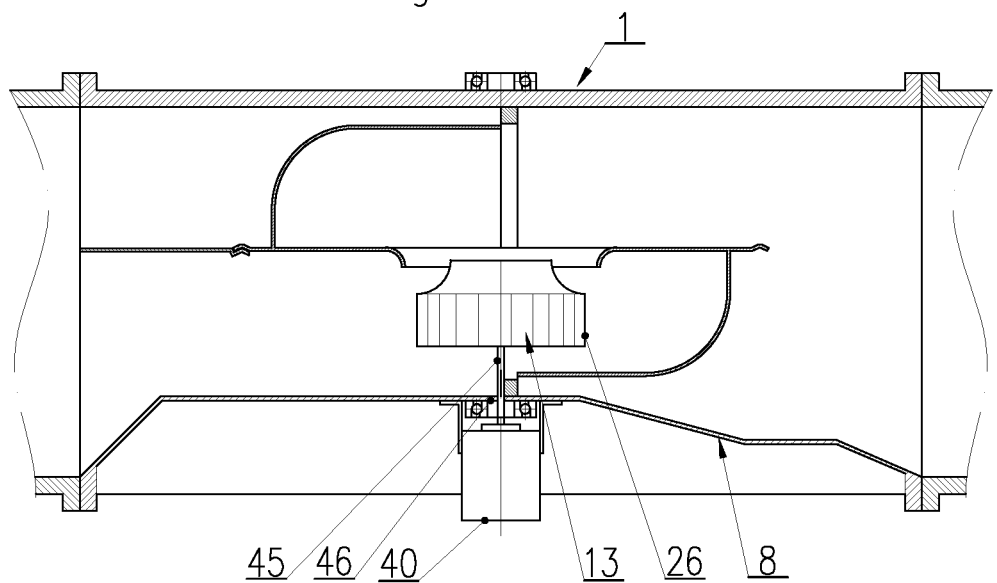
FIG. 16—shows a longitudinal cross-section through the middle part of the device with a two part air driver and an external fan drive.

A ventilation device according to the disclosure has a longitudinal, through compartment 1 with two terminal openings 2 and 3, wherein the left opening 2 of compartment 1 is connected to an opening 4 formed in the external wall 5 of a ventilated building, not shown, while the right opening 3 opens freely to the interior of the building. According to a FIGS. 1-4, the through compartment 1 is equipped with a reversible air driver 6, rotating on a bearing and attached to opposite walls 7, 8 of the compartment 1. The air driver 6 is made of a hollow suction-inlet body 9 and a hollow pumping-outlet body 10 with the same rotation axis X. Each body 9, 10 of the driver 6 is provided with a side outlet 11 and a through frontal opening 12, wherein the side outlets 11 of both bodies 9, 10 are oriented in opposite directions, and axes of frontal openings 12 in both bodies 9, 10 are aligned with their mutual rotation axis X. A radial fan 13 with constant direction of rotation is located in the pumping-outlet body 10 of the driver 6. Two ribs 14, 15 are formed on circumferential edges of the bodies 9, 10 of the driver 6, tightly fitted to the internal, circumferential frame 16 of walls of the compartment 1 at their extreme ends, dividing the compartment in the transverse direction. According to a FIGS. 3 and 4, the through compartment 1 is divided into three parts in a serial layout, A, B and C. The reversible air driver 6 is located in the middle part B of the through compartment 1. A longitudinal partitioning element 17 is passing through the initial part A and through the middle part B of the compartment 1, separating these parts into two parallel branches formed as a suction duct 18 and as a pumping duct 19. Air treatment devices are located inside the suction duct 18 and inside the pumping ducts 19 of the initial part A and of the middle part B of the through compartment 1, in the form of an air filter 20, a regenerative heat exchanger 21 and a sound muffler 22. In the embodiment according to FIG. 1-6, the through compartment 1 of the device has a uniform driver 6, the suction-inlet body 9 of which is rigidly connected to the pumping-outlet body 10. The partitioning element 17 of the compartment 1 is provided with a concave edge formed as an arc 23 on the driver 6 side, meshed with a rotary flange 24, located between the two bodies 9, 10 of the driver 6, and comprises an integral element of each of them, and in which a through opening 25 is formed with an outline of a funnel matching the internal diameter of the rotor 26 of the fan 13. The flange 24 separates the middle part B of the compartment 1 into suction areas 27, 28 and pumping areas 29, 30. According to FIG. 7, a contactless labyrinth seal 31 is provided at the junction 23 of the longitudinal partitioning element 17 of compartment 1 and of the flange 24 of the driver 6. As shown in FIG. 11, the through compartment 1 in another embodiment of the solution is provided with a two part driver 6a, divided into the suction-inlet body 9 and a separate, pumping-outlet body 10, each of which is provided with a through, frontal opening 32 surrounded by a ring-shaped protrusion 33. The partitioning element 17 of the compartment 1 are provided with a round opening 34 in the middle section B, surrounded on both sides by a pair of ring-shaped protrusions 35. Both bodies 9, 10 of the drivers 6a are located on both sides of the round openings 34 of the partitioning element 17, and their ring-shaped protrusions 33 are meshed with a pair of ring-shaped protrusions 35 of the partitioning element 17. According FIG. 12, contactless labyrinth seals 36 are provided at the junction of protrusions 35 surrounding the opening 34 of the partitioning element 17 and of protrusions 33 surrounding the frontal openings 32 of both bodies 9, 10 of the two part driver 6a. As shown in FIG. 13, each of the bodies 9, 10 of the two part driver 6a is provided with a separate drive motor 37, while according to FIG. 14, bodies 9, 10 of the two part driver 6a are driven by their common motor 37a using a gear 38. According to a FIG. 2, the drive motor 37 is also adapted as an element starting a uniform reversible driver 6 using a hitch-type gear 37b. If high efficiency of the ventilating device is not required, it is provided with a single through compartment 1. In other cases, the ventilation device according to FIGS. 8 and 9 is provided as a set of two through chambers 1, 1a, located one after another. The middle parts B of compartments 1, 1a are connected using an intermediate duct 39, where an air treatment device is located, in the form of a regenerating heat exchanger 21. Initial parts A of both through compartments 1, 1a with partitioning elements 17 formed in them are located at opposite ends of the compartment set 1, 1a, wherein two air filters 20 are located in the suction ducts 18 separated by these partitioning elements. In the case of a ventilation device which does not require high compression rates, the driver 6, 6a located inside one of the two through compartments 1, 1a of this unit is missing a fan. The air treatment device, located inside the suction duct 18 and inside the intermediate duct 39 of the through compartment 1, 1a, has the form of a regenerating heat exchanger 21. As shown in FIG. 15, the driving element of fan 13 is provided as an electric motor 40 located inside its fan 26 and connected to it, the body 41 of which is placed on a removable disc 42 with a matching profile 43, wherein the disc 42 is installed on the free end of the support 44, the opposite end of which is attached to the wall 8 of the compartment 1. In another embodiment presented in FIG. 16, the driving element of the fan 13 is an electric motor 40 located outside the through compartment 1, attached to the wall 8 of the compartment and connected to the rotor 26 of the fan 13 using a drive shaft 45, passing through a sealed opening 46 in the wall 8 of the compartment 1.

Figure 17:
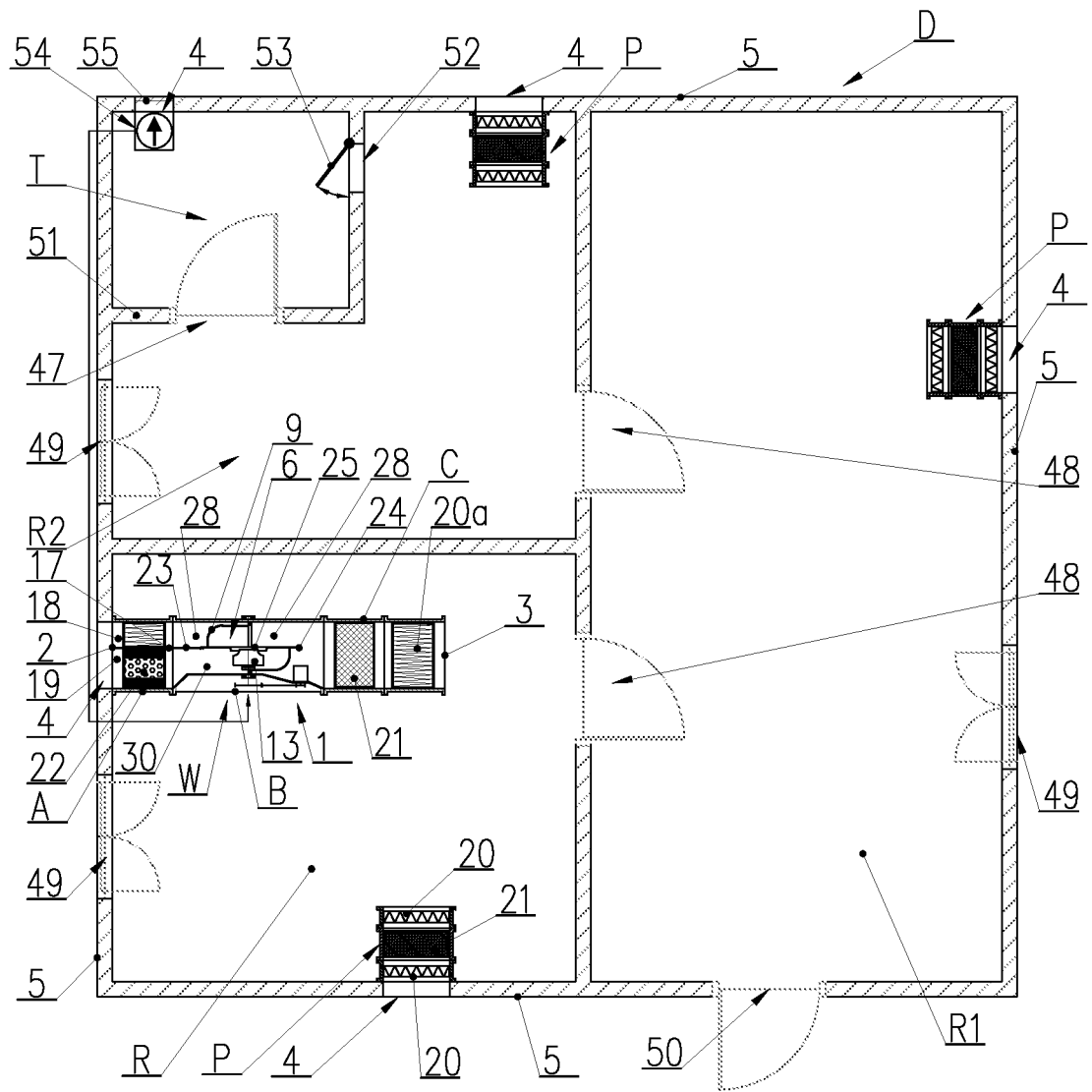
FIG. 17—shows a horizontal cross-section through a building with a duct-free reverse ventilation system, provided with a single, one-compartment ventilation device with a uniform air driver and a set of simplified ventilation fans.
Figure 18:
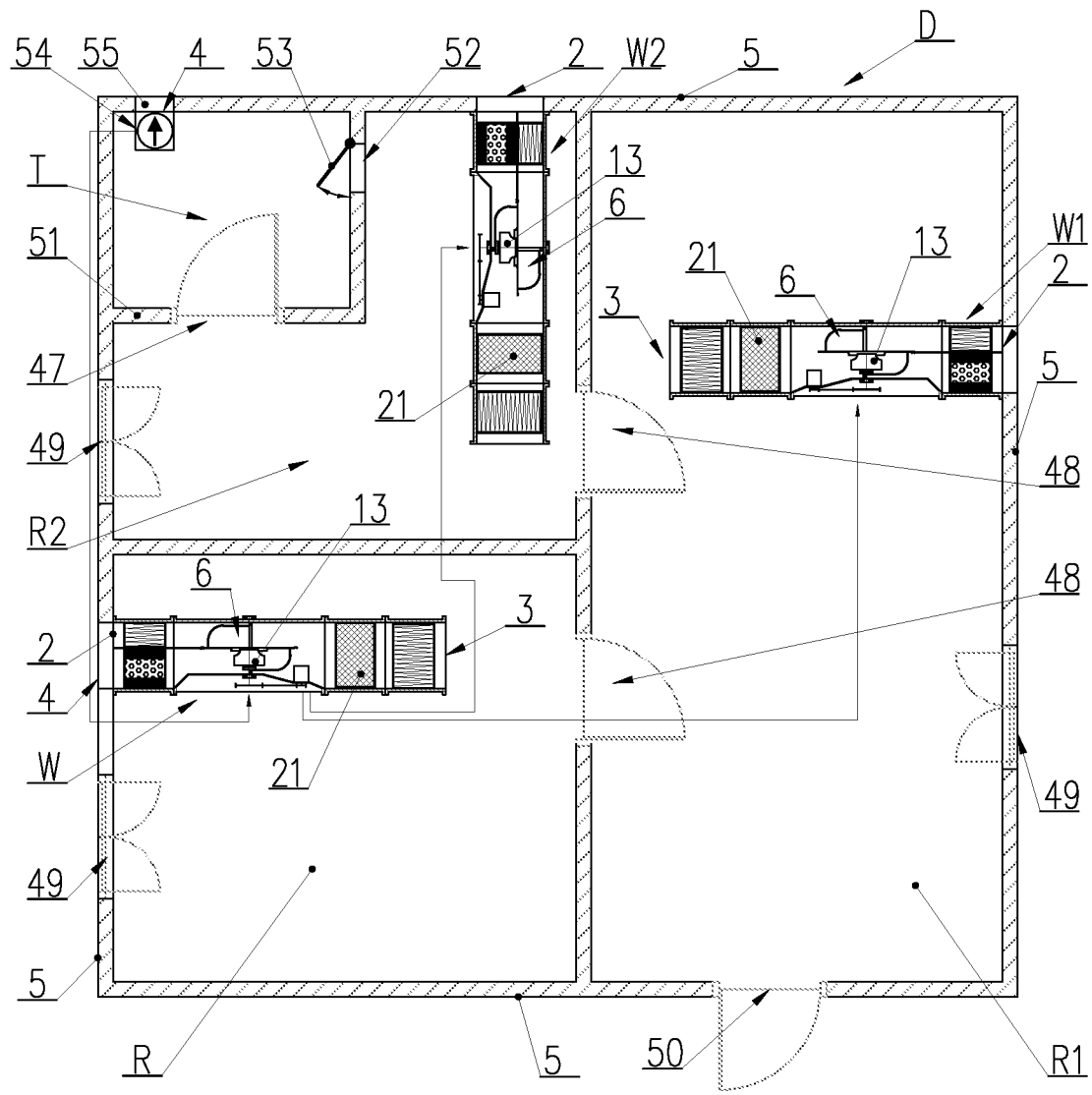
FIG. 18—shows a cross-section through the building with a ventilation system, equipped with a central, single compartment ventilation device and a set of local ventilation devices.
Figure 19:
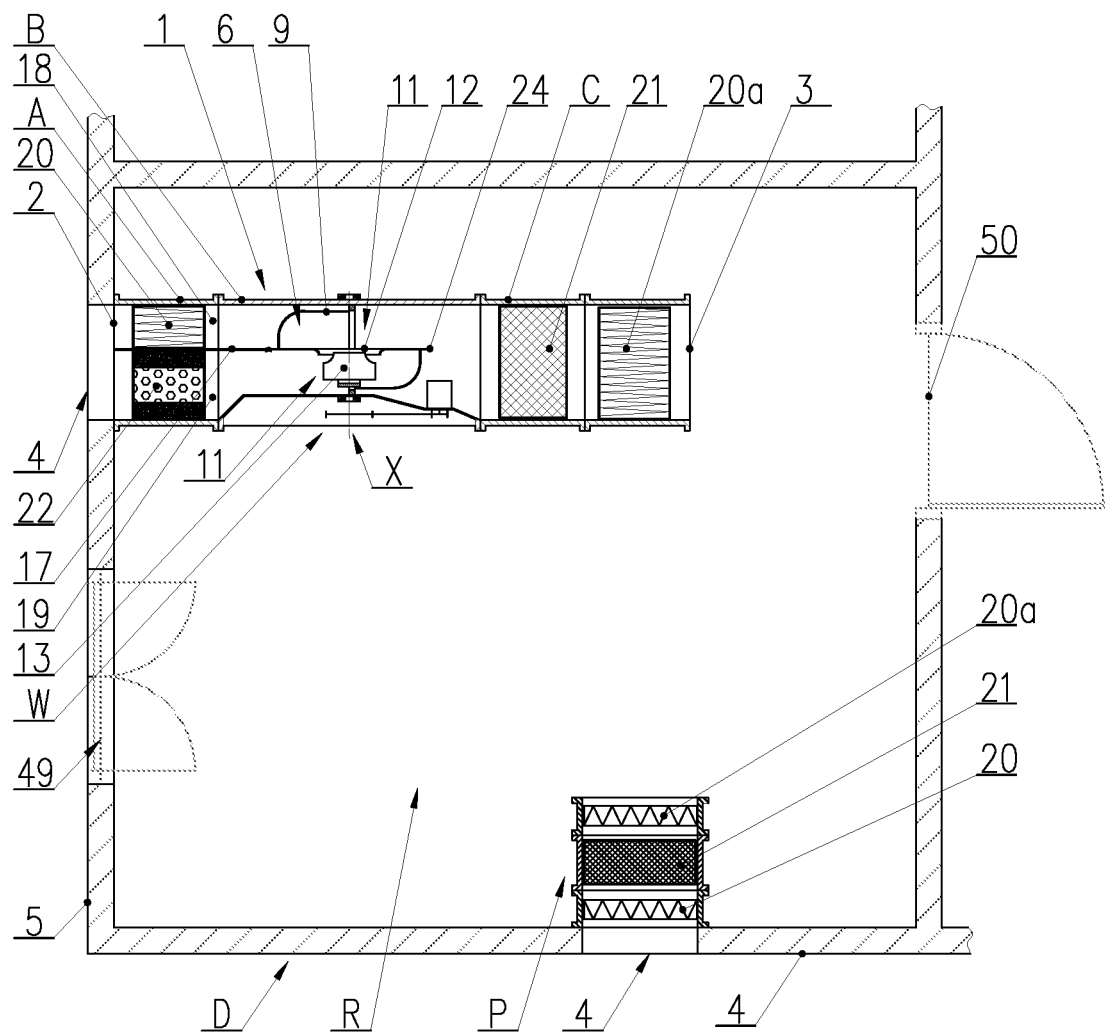
FIG. 19—shows a horizontal cross-section through the main premise of the building with a ventilation system equipped with a single, one-compartment ventilation device with a uniform air driver and one simplified ventilating fan.
Figure 20:
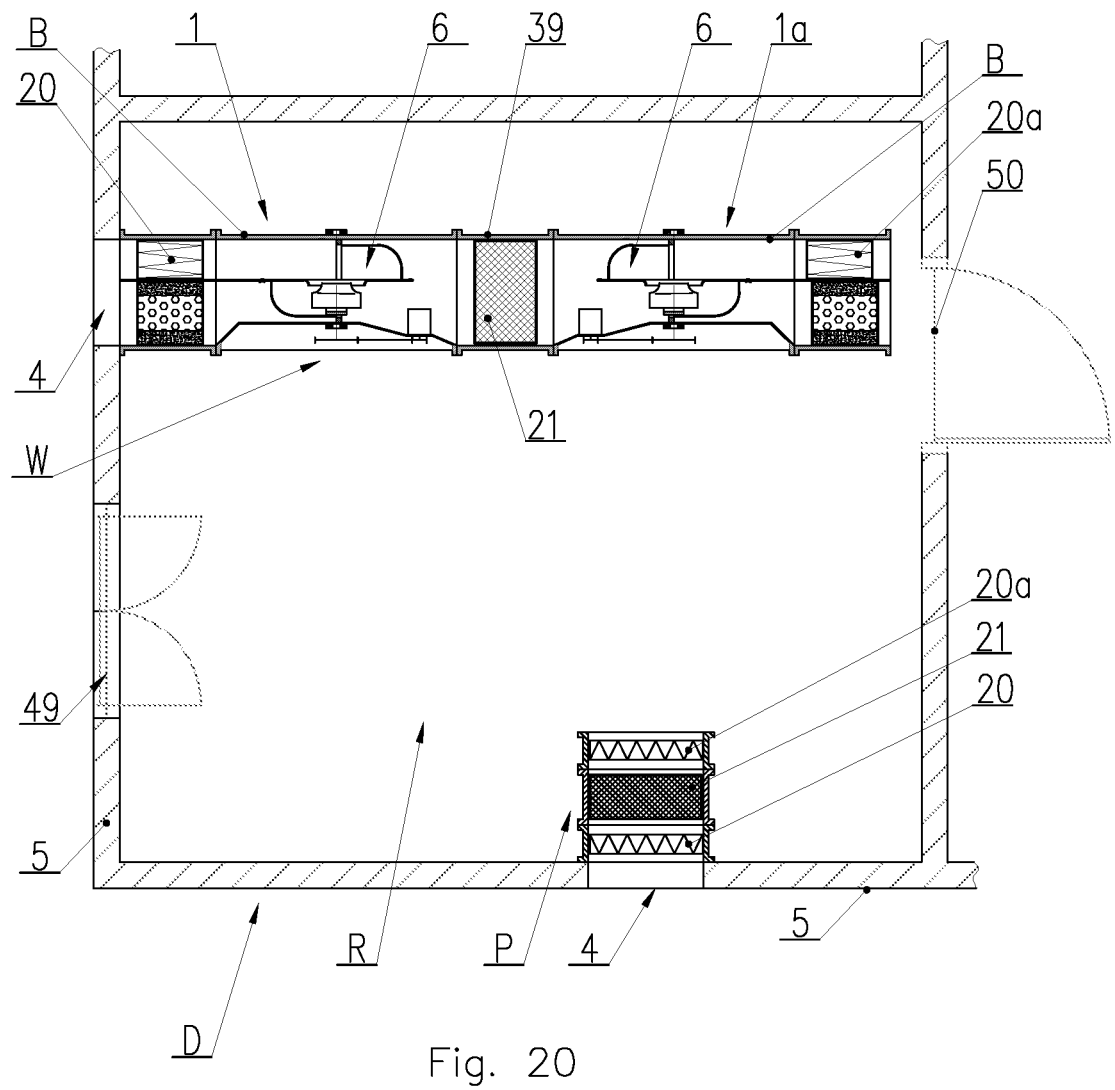
FIG. 20—shows a horizontal cross-section through the premise of the building with a ventilation system, equipped with a two-compartment ventilation device and a simplified ventilating fan.
Figure 21:
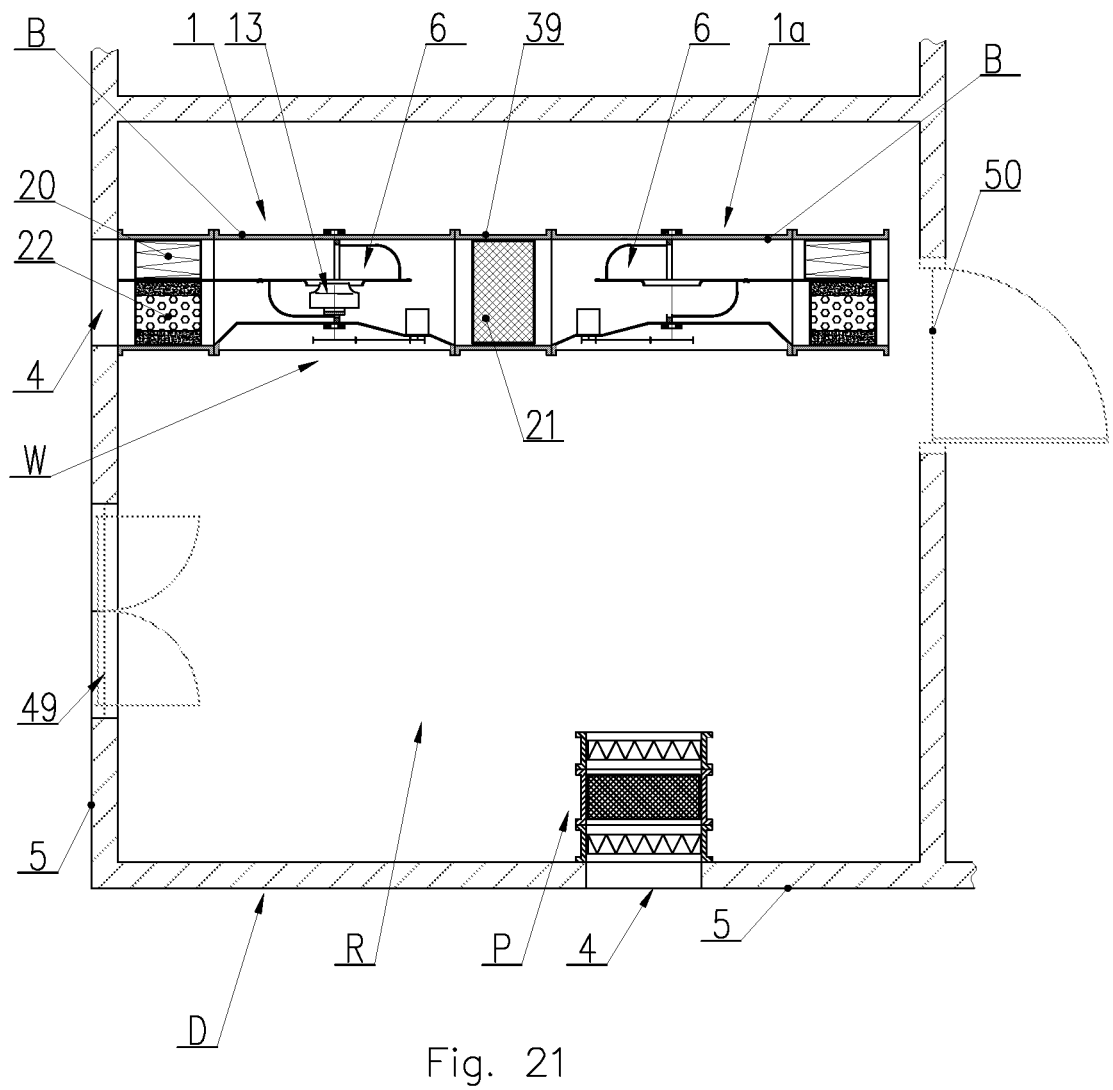
FIG. 21—shows a horizontal cross-section through a premise of a building with a ventilation system according to FIG. 19, wherein one of the compartments of the ventilation device is missing a fan.
Figure 22:
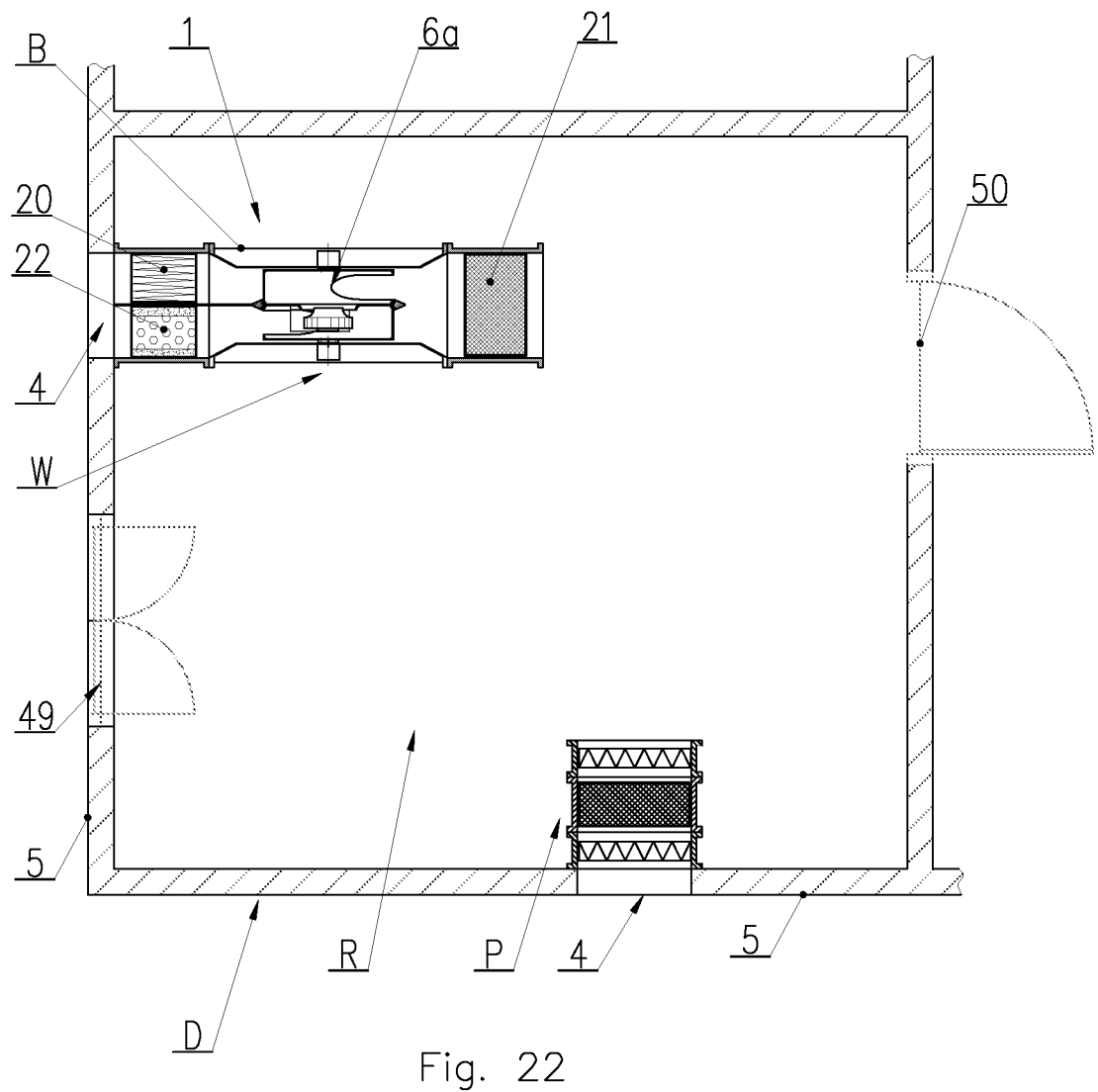
FIG. 22—shows a horizontal cross-section through a premise of a building with a ventilation system according to FIG. 19, wherein the compartment of the ventilation device is provided with a two part air driver.
Figure 23:
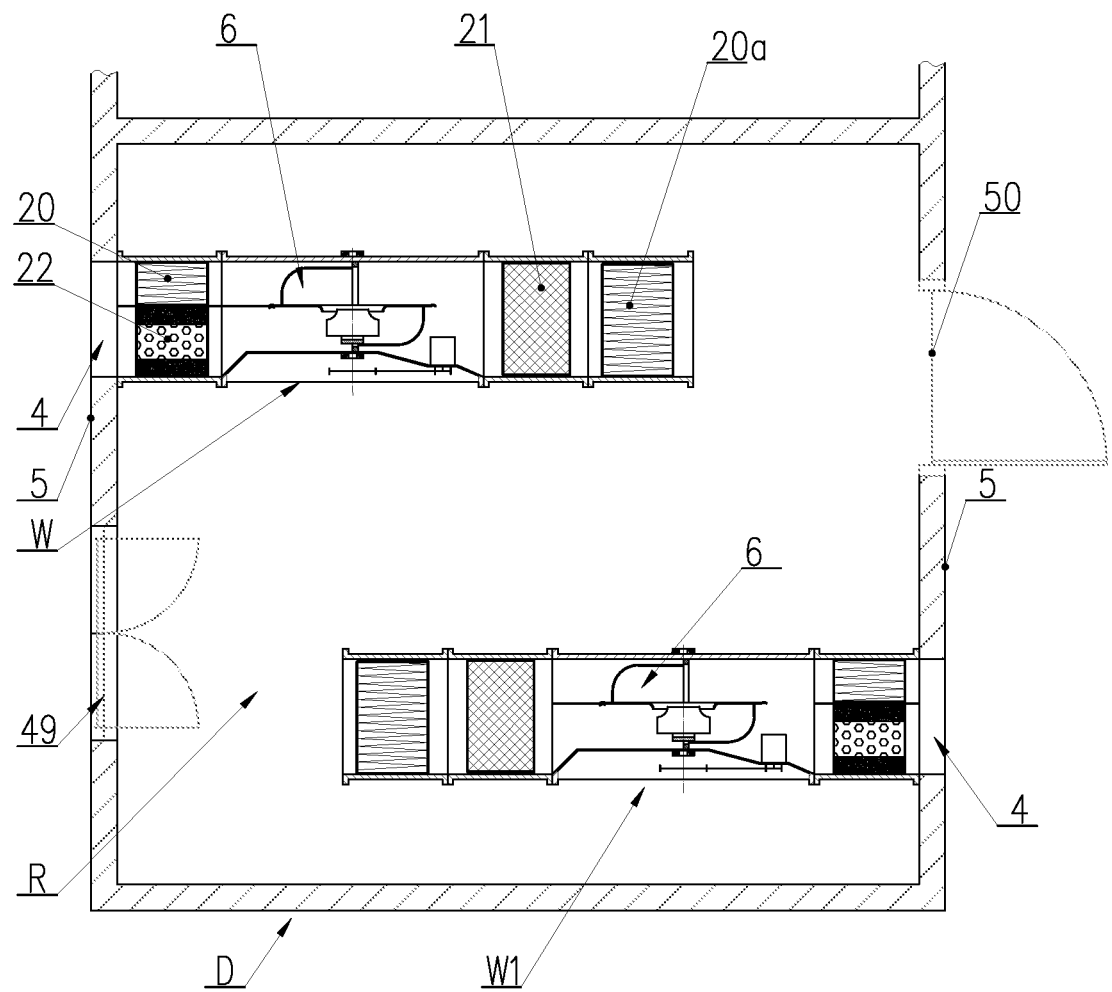
FIG. 23—shows a horizontal cross-section through a premise of a building with a ventilation system, equipped with two opposite, single compartment ventilation devices.
Figure 24:
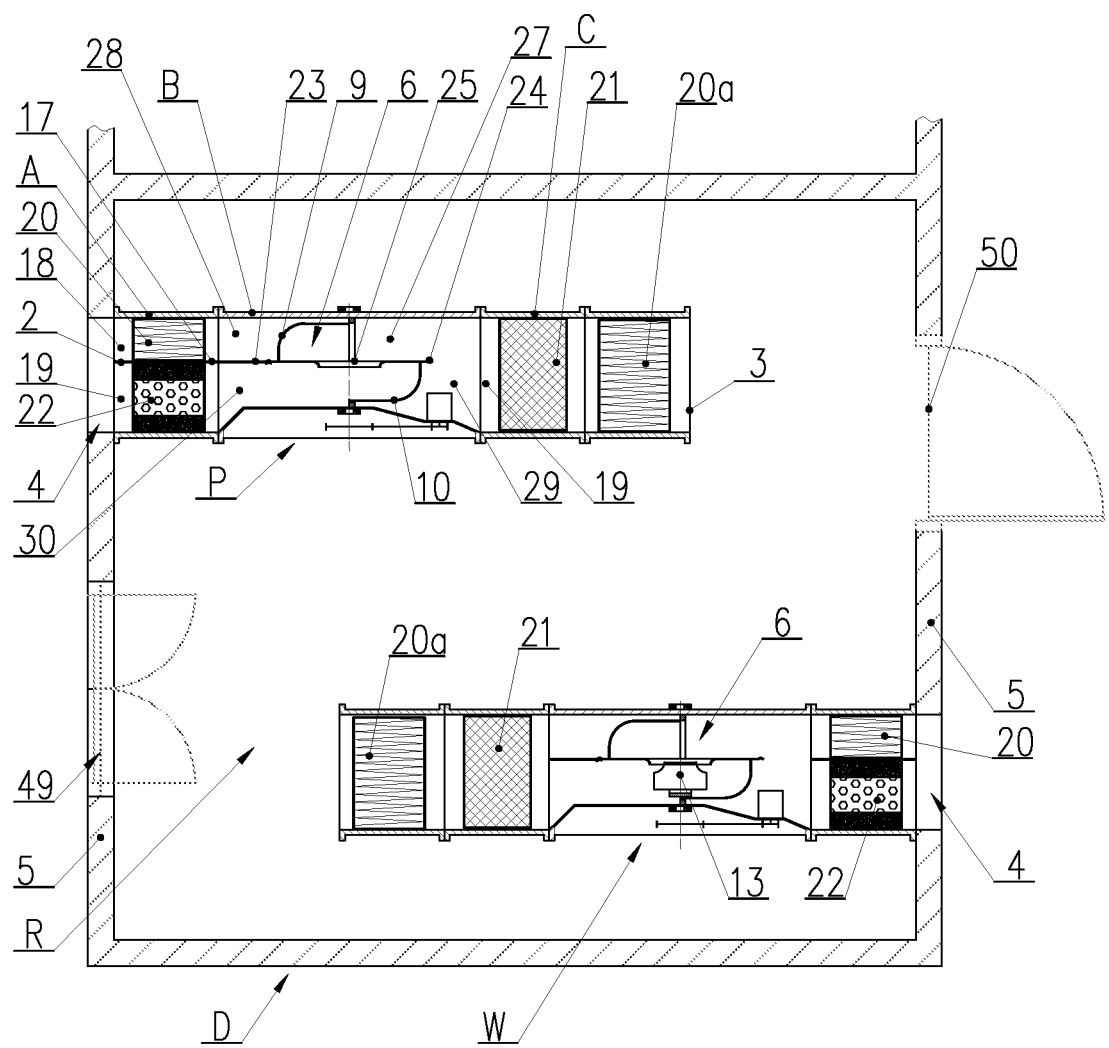
FIG. 24—shows a horizontal cross-section through a premise of a building with a ventilation system, equipped with a single compartment ventilation device and an expanded ventilating fan with a uniform air driver.
Figure 25:
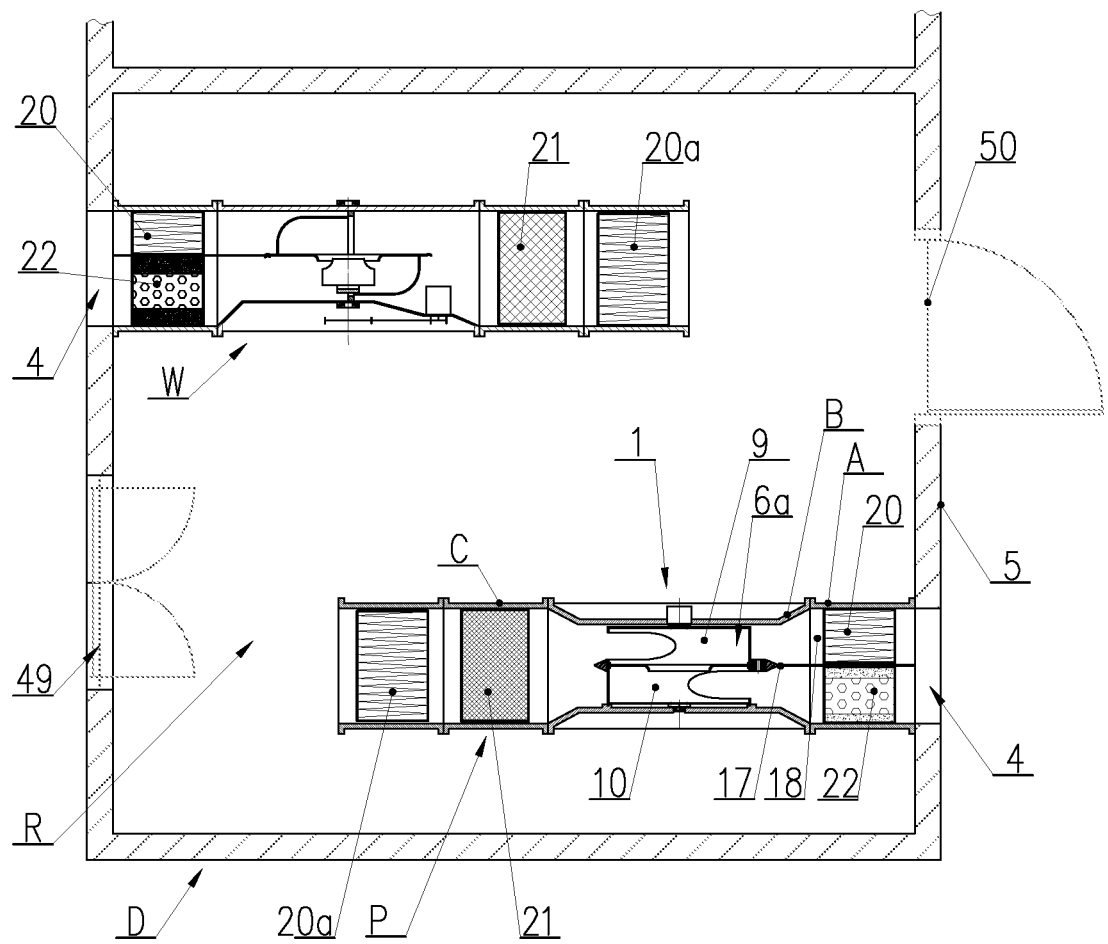
FIG. 25—shows a horizontal cross-section through a premise of a building with a ventilation system, equipped with a single compartment ventilation device and an expanded ventilating fan with a two part air driver.
Figure 26:
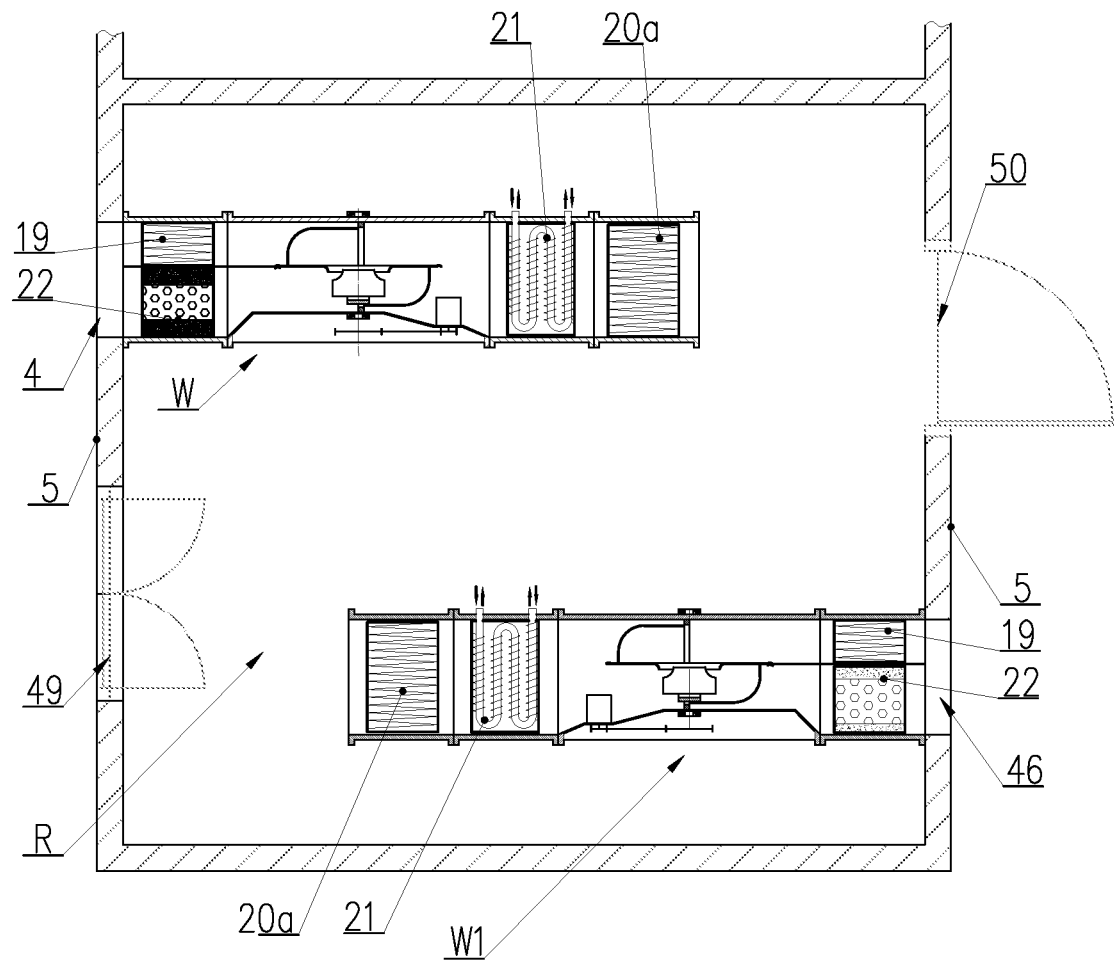
FIG. 26—shows a horizontal cross-section through a premise of a building with a ventilation system according to FIG. 18, wherein the single compartment ventilation device is provided with additional heat exchanger.

A duct-free reversible ventilation system according to the solution, intended for use in buildings D, where people are present, is provided with inlet-outlet ventilation systems, active in opposite air inlet or outlet phases. As shown in FIGS. 17 and 19, one of these systems is provided as a ventilation device W, formed in a single, through compartment 1 with two inlet-outlet terminal openings 2, 3 and with a uniform, reversible 6 placed inside on a bearing, while the second ventilation installation is provided as simplified, passive ventilation fans P. The air driver 6 is made of a hollow suction-inlet body 9 and a hollow pumping-outlet body 10 with the same rotation axis X. Each body 9, 10 of the driver 6 is provided with a side outlet 11 and a through frontal opening 12, wherein the side outlets 11 of both bodies 9, 10 are oriented in opposite directions, and axes of frontal openings 12 in both bodies are aligned with their mutual rotation axis X. A radial fan 13 with constant direction of rotation is located in the pumping-outlet body 10 of the driver 6. The through compartment 1 of the ventilation device W is divided into three parts A, B and C in a serial layout, wherein the air driver 6 is located in the middle part B of compartment 1. A longitudinal partitioning element 17 is passing through the initial part A and through the middle part B of the compartment 1, separating these parts into two parallel branches formed as a suction duct 18 and as a pumping duct 19. Air treatment devices 20, 21, 20a are located inside the suction duct 18 and the pumping ducts 19 of the initial and of the middle parts A, B of the through compartment 1. One of terminal openings 2 of the through compartment 1 is connected to an opening 4 formed in the external wall 5 of the building D, and the other terminal opening 3 of the compartment 1 is located inside the main premise R of the building D. This building is provided with a toilet room T with tight doors 47, while internal doors 48 of its other premises R1 and R2 are provided with openings (not shown) ensuring air flow. According to FIG. 17-19, the ventilation device W has a single through compartment 1, and the embodiment according to FIG. 20-21 comprises a set of two through compartments 1 and 1a, located one after the other and connected using an intermediate duct 39, where an air treatment device is provided, in the form of a regenerating heat exchanger 21. In the case of a two compartment ventilation device W according to FIG. 21, the air driver 6 in one of its two through compartments 1a lacks a fan. As shown in FIG. 17-20, a uniform air driver 6 is placed in the middle section B of the through compartment 1, while according to FIG. 22, a two part air driver 6a is located inside the middle part B of the compartment 1. In the embodiment according to FIG. 23, the ventilation systems are formed by two single compartment ventilation devices W with identical efficiency, installed on the opposite sides, at external walls 5 of the building D. According to FIG. 18, one of the ventilation installations is provided as a single compartment, central ventilation device W, wherein one of terminal openings 3 of the through compartment 1 of this device is located within the internal wall 5 of the building D, and the second terminal opening 3 of the compartment 1 is located inside the main premise R of the building D, while the second ventilation installation is formed using local, single compartment ventilation devices W1 and W2, installed in the remaining, ventilated premises R1 and R2 of the building D. One of the openings 2 of the through compartments 1 of each of the local ventilation devices W1, W2 is located in the internal wall 5 of the building D, within the ventilated room R1, R2, while the second opening 3 of the compartment 1 is located inside this room. According to FIG. 17, passive ventilation fans P are connected to openings 4 formed within the internal wall 5 of the building D, provided with tight windows 49 and tight external doors 50. The simplified ventilation fan P includes a stationary, regenerating heat exchanger 21 and two air filters 20 placed on its sides and connected to the opening 4 of the external wall 5 of the building D. An expanded ventilation fan P according to FIG. 24 is equipped with a fresh air filter 20, a uniform air driver 6, a stationary, regenerating heat exchanger 21 and a used air filter 20a, in a serial layout inside the through compartment 1 with two terminal openings 2 and 3, wherein one opening 2 of the compartment 1 is located inside an opening 4 of the external wall 5 of the building D, and the second opening 3 is located inside the ventilated room R. As shown in FIG. 24, the suction-inlet body 9 of the air driver 6 inside the ventilating fan P is rigidly connected to its pumping-outlet body 10, while the partitioning element 17 of the through compartment 1 is provided with a concave, arc-shaped edge 23 on the side of the air driver 6, meshed with a rotary flange 24, located between the two bodies 9, 10 of the driver, comprising an internal element of each and with a through opening 25 formed therein. The flange 24 separates the middle part B of the through compartment 1 into suction zones 27, 28 and into pumping zones 29, 30, while the suction compartment 18 of the initial part A of the compartment 1 hosts a fresh air filter 20, while a heat exchanger 21 and a used air filter 20a are located inside the pumping duct 19 of the end part C of the compartment 1. According to the solution according to FIG. 25, the ventilating fan P is provided with a two part air driver 6a with the same design as the driver presented in FIG. 12. According to FIG. 17, the ventilation installation includes many ventilating fans P, wherein one ventilating fan P is installed in each of the ventilated premises R, R1, R2 of the building D. In the case of the embodiment presented in FIG. 17-25, the regenerating heat exchanger 21 is provided as a stationary, accumulating bed, through which the ventilation air flows, whilst in the case of the embodiment according to FIG. 26, the regenerating heat exchanger 21 is provided as a flow heater/cooler, filled with a thermodynamic medium subjected to condensation/evaporation cycles caused by pressure changes. According to FIG. 17, the toilet T of the building D is provided with a ventilation opening 52 with a flap 53 swivelling to one side in its internal wall 51, wherein the flap automatically opens towards the interior of the toilet room T as a result of air flow, whilst it closes under the influence of gravity. The toilet room T is also provided with a periodically operating outlet fan 54, with a blind 55 cutting off the air flow when switched off. The toilet room T fan 54 is provided with a signalling device indicating that the fan has been switched on or with a wired or wireless connection with the radial fan 13 of the ventilation device W, ensuring a periodic decrease of its rotation speed.

The ventilation device with a duct-free, reversible ventilation system for buildings are provided with an electronic system, not shown in the Figures, used to control the rotation speed of the fan motor, thus regulating the amount of inlet and outlet air, and to control the reverse drive of the reversible driver, causing its cyclic rotation in order to achieve the pre-set reversible ventilation program. The electronic system is provided with a set of temperature sensors, relative humidity sensors and $CO_2$ level sensors. Depending on the local weather conditions and current air parameters inside the building, the system automatically determines the rotation speed of the fan rotor and the rotational frequency of the reversible air driver, in order to limit the losses of energy required to heat or cool the building whilst retaining thermal comfort of the users.

During the inlet phase, fresh air is introduced through the opening 4 in the wall 5 of the building D and the terminal opening 2 of the compartment 1 into the compartment of the ventilation device, which flows through the suction duct 18 and the air filter located inside 20, above the longitudinal partitioning element 17 in the initial part A of the compartment 1. Next, the air flows above and along the rotary flange 24 of the driver 6, through the suction zone 27 of the middle part B of the compartment 1 and the suction-inlet body 9 located therein, and is then drawn by the fan 13 and flows through the opening 25 of the driver 6 to the pumping area 29 of the middle part B of compartment 1, below the rotary flange 24. Finally, the air flows through the uniform, end part C of the compartment 1 and through the heat exchanger 21 located therein, finally leaving the compartment 1 through its opposite terminal opening 3. During the outlet phase, the air driver 6 and its bodies 9, 10 are rotated at an angle not greater than 180°. Used air flows into the compartment 1 through its terminal opening 3, initially flowing through the end part C of the compartment 1 with a regenerating heat exchanger 21 located therein. The air then bypasses the pumping body 10 of the driver 6 and flows through the suction area 28 of the middle part B of compartment 1 and through the suction-inlet body 9 located therein, then is drawn by the fan 13 and flows through the opening 25 of the driver 6 to the pumping area 30 of the middle part B of compartment 1 under the rotary flange 24 and under the partitioning element 17, passing through the initial part A of the compartment 1. The air then flows through the pumping duct 19 of the initial part A of the compartment 1 and the muffler 22 located therein and leaves the compartment 1 through its terminal opening 2, and outside the building D through the opening 4 in the internal wall 5. The inlet and outlet phases are similar in a two compartment ventilation device according to FIGS. 8 and 9. During the inlet phase, air flowing from the middle part B of the first compartment 1 flows through the intermediate duct 39 and the heat exchanger located there in 21, and flows to the second compartment 1a, above the partitioning element 17 in the middle part B, and is then pumped by the fan 13 and flows through the pumping duct 19 of the compartment 1a and the sound muffler 22 located therein, eventually leaving the compartment 1a through its opening 2 and into the building D. Analogously, during the outlet phase, air flowing from the middle part B of the second compartment 1a flows through the intermediate duct 39 in the opposite direction, and then through the compartment 1 and its pumping duct 19 with a sound muffler 22 inside it, eventually leaving this compartment through the terminal opening 2, and outside the building D through the opening 4 in the building wall 5.

In the case of the ventilation system according to FIG. 17, fresh air is provided during the inlet phase from outside the building D to the ventilation device W, located inside the main premise R, and subsequently, operation of the fan 13 pushes the air out from the device W into the premise, and with a positive pressure of several Pascals flows to neighbouring premises R1 and R2, removing used air from there through ventilating fans P located in openings 4 in walls 5 of the building (D). After several seconds, the driver 6 is reversed inside the ventilation device W, the 13 fan ow which draws and removes used air from the building D, whilst fresh air is simultaneously drawn into the building through the ventilating fans P. Again, after several seconds, the air driver 6 is reversed again and the ventilation device W again pumps fresh air into the building D. Thus, cyclical changes of air inlet and outlet phases according to the solution take place inside the ventilation system of this building D. The fan 54 of the toilet room T, intended for periodic operation intended to remove used air from the room, is started in the known mode for a period between 3 and 10 minutes as controlled by a signal sent by a lighting switch and/or motion sensor and/or humidity sensor (not shown). When the fan 54 is switched off, its tight blind 55 is closed. The flap 53 closing the opening 52 in the wall 51 of the toilet room T opens automatically under negative pressure inside the toilet room T. Its fan 54 is equipped with a signalling module (not shown) for the purpose, cooperating with the radial fan 13 of the ventilation device W. Signals generated by the fan 54 when the toilet room T is used causes the rotation speed of the radial fan 13 to decrease such that negative pressure generated inside the toilet room T is greater than the negative pressure outside the toilet room. In the ventilation system according to FIG. 18, ventilating fans P have been replaced with local ventilation devices W1 and W2 with the same design as the main device W. As a result of electric coupling of their drives, air drivers 6 of the main ventilation device W and of the local devices W1, W2 are oriented in opposite directions during air inlet and outlet phases. Thanks to this solution, used air is removed from the building D by fans 13 of the local ventilation devices W1 and W2, while during the outlet phase, fresh air is pumped into the building D using fans 13, through reversed fans 6 of the local devices W1, W2.

LIST OF REFERENCE NUMERALS

1—compartment
1a—compartment
2—compartment opening
3—compartment opening
4—wall opening
5—building wall
6—uniform driver
6a—two part driver
7—compartment wall
8—compartment wall
9—suction-inlet body
10—pumping-outlet body
11—body outlet
12—frontal opening of the body
13—fan
14—body rib
15—body rib
16—body frame
17—partitioning element
18—suction duct of the compartment
19—pumping duct of the compartment
20—fresh air filter
20a—used air filter
21—heat exchanger
22—sound muffler
23—partitioning element edge
24—rotary flange
25—driver opening
26—fan rotor
27—suction area
28—suction area
29—pumping area
30—pumping area
31—seal
32—frontal opening of the body
33—body protrusion
34—partitioning element opening
35—partitioning element protrusion
36—seal
37—body drive motor
37a—common body drive motor
37b—gear
38—gear
39—intermediate duct
40—fan motor
41—engine body
42—support disc
43—disc profile
44—disc support
45—drive shaft of the motor
46—compartment wall opening
47—toilet door
48—internal door
49—window
50—external door
51—toilet wall
52—ventilation opening
53—opening flap
54—toilet fan
55—fan blind
A—compartment part
B—compartment part
C—compartment part
D—building
P—ventilating fan
R—building location
R1—building location
R2—building location
T—toilet room
W—ventilation device
W1—ventilation device
W2—ventilation device
X—body rotation axis

What is claimed is:

1. A system of reversible ventilation of buildings with people present, comprising ventilation and heat recovery devices, wherein the system further comprises at least two inlet-outlet ventilation installations (W, P), active in opposite inlet or outlet phases, wherein at least one of these installations comprises a ventilation device (W), formed inside at least one through compartment (1, 1a) with two inlet—outlet, terminal openings (2, 3) and with a reversible air driver (6, 6a), rotatably mounted on a bearing, formed by a hollow suction—inlet body (9) and a hollow, pumping—outlet body (10), both bodies rotated separately along a common rotation axis (X), wherein during the outlet phase the air reversible driver (6) and the bodies (9, 10) are rotated at an angle not greater than 180°, wherein a control of the air flow is obtained by reversing the position of the air driver (6, 6a), such that the air flow changes direction, wherein each of the bodies (9, 10) of the driver (6, 6a) is provided with a side outlet (11) and frontal through openings (12), wherein the side outlets (11) of the both bodies (9, 10) are mounted opposite each other, and axes of the frontal through openings (12) of the both bodies (9, 10) are aligned with the common rotation axis (X), wherein a radial fan (13) which continuously rotates in a fixed direction is placed in the pumping—outlet body (10) of the driver (6, 6a) in at least one through compartment (1, 1a), wherein each of the at least one through compartments (1, 1a) of the ventilation device (W) is divided into three parts (A, B, C) in a parallel layout, and the reversible air driver (6, 6a) is located in a middle part (B) of the at least one through compartment (1, 1a), while a fixed partition (17) is passing through an initial part (A) and the middle part (B) of the at least one through compartment (1, 1a), separating them into two parallel branches formed as a suction duct (18) and a pumping duct (19), wherein in the suction duct (18) and in the pumping ducts (19) of the initial and of an end part (A, C) of the at least one through compartment (1, 1a) air treatment devices (20, 21, 22) are located and that one of the terminal openings (2) of the at least one through compartment (1, 1a) is connected to an opening (4) in an external wall (5) of a building (D), and the second terminal opening (3) of the at least one through compartment (1, 1a) is located inside a main premise (R) of the building, wherein each of the bodies has the frontal through opening surrounded with an annular protrusion, wherein the both bodies and of the deflector are arranged opposite a fixed partition having a round through opening with its edge of a funnel outline surrounded on two sides with a pair of annular protrusions in such a manner that the common axis X of the frontal openings of the bodies is aligned with an axis of the round opening of the partition surrounded on two sides with the pair of annular protrusions, and the annular protrusions of the bodies and are in mesh with the pair of the annular protrusions of the partition, wherein two ribs (14, 15) are formed on circumferential edges of the bodies (9, 10) of the air driver (6), abuttingly fitted to an internal, circumferential frame (16) of walls of the compartment (1) at their extreme ends, dividing the compartment in a transverse direction, and wherein in order to prevent uncontrolled air flow between the suction and the pumping areas of the through compartment, a contactless labyrinth seal is formed at the junction of the compartment edge and a rotary flange.

2. The system according to claim 1, wherein the ventilation device (W) has a single through compartment (1).

3. The system according to claim 1, wherein the ventilation device (W) comprises a system of two through compartments (1, 1a) located one after another, wherein the two through compartments (1, 1a) are connected via an intermediate duct (39), wherein an air treatment device in a form of a regenerative heat exchanger (21) is located.

4. The system according to claim 1, wherein in the at least one through compartment (1a) of the ventilation device (W), the reversible air driver (6) lacks a fan.

5. The system according to claim 1, wherein the uniform air driver (6) is located in a second part (B) of the at least one through compartment (1, 1a), and wherein a two part air driver (6a) is located in the second part (B) of the at least one through compartment (1, 1a).

6. The system according to claim 1, wherein the inlet-outlet ventilation systems are made of two ventilation devices (W) with identical efficiency, installed on the opposite external walls (5) of the building (D).

7. The system according to claim 1, wherein one of the inlet-outlet ventilation systems is provided as the ventilation device (W), while other ventilation system includes at least one passive ventilating system (P), connected to an opening (5) in the external wall (5) of the building (D), equipped with abuttingly fitted windows (49) and with abuttingly fitted external doors (50).

8. The system according to claim 1, wherein the ventilating fan (P) is made of a stationary, a regenerating heat exchanger (21) and two air filters (20, 20a) located on sides of the fan, located inside an opening (5) of an external wall (4) of the building (D).

9. The system according to claim 1, wherein one of its inlet-outlet ventilation systems is provided as a central ventilating device (W), wherein one of the openings (2) of the through compartment (1, 1a) of this device is located in an external wall (5) of the building (D), and the second opening (3) of the through compartment (1, 1a) is located inside the main, ventilated premise (R) of the building (D), while the second ventilation system includes many local ventilation devices (W1, W2), installed in the remaining, ventilated premises (R1, R2) of the building (D), wherein one of the openings (2) of the through compartment (1, 1a) of each of the local ventilation devices (W1, W2) is located in an external wall (5) of the ventilated premise (R1, R2), and the second opening (3) of the through compartment (1, 1a) is located inside this premise.

* * * * *